May 21, 1940.   H. PFISTER   2,201,563
REGULATION OF SOUND IN LOW FREQUENCY CIRCUITS
Filed Feb. 20, 1937

INVENTOR
HUBERT PFISTER
BY
ATTORNEY

Patented May 21, 1940

2,201,563

UNITED STATES PATENT OFFICE 2,201,563

REGULATION OF SOUND IN LOW FREQUENCY CIRCUITS

Hubert Pfister, Grafelfing, Germany, assignor to Telefunken Gesellschaft für Drahtlose Telegraphie m. b. H., Berlin, Germany, a corporation of Germany Application February 20, 1937, Serial No. 126,773
In Germany February 10, 1936

8 Claims. (Cl. 179—171)

This invention relates to a circuit organization adapted to regulate volume range or contrast ratio in low-frequency transmission systems.

In the operation of means designed to regulate the volume range or contrast ratio in low-frequency or audio frequency transmission systems such as microphone pickup or modulation, sound recorder, sound-film and transmitter modulation systems, it has proved to be useful to have available means to vary the amount of contrast or degree of compression or expansion inasmuch as the optimum amount of contrast varies according to the conditions of the pick-up. The most favorable regulation is more or less a function of the nature of the program or entertainment. Hence, it is of practical utility to so design the regulator or contrast control means that the characteristics thereof may be varied or adjusted at will.

According to former practice, it has been customary to effect a circuit change in the regulator or contrast control stage itself so as to insure different contrast ratio curves determined for each case, with a view to insuring a change in the "degree" of regulation. However, this method is unable to give full satisfaction. More particularly speaking, it involves the drawback that the contrast control amplifier operates under different conditions according to the regulation curve; hence, for a check-up it was necessary to make a test of the particular degree of contrast to which adjustment may be made. Together with the change in regulation it is often necessary in practice to effect a change in amplification, since in most cases a common reference point for all regulation curves is required, for instance, equal volume level for maximum or medium modulation.

Now, according to this invention arrangements are made in such a way that adjustment may be made to any desired contrast control characteristic without the characteristics of the regulator stage, and thus the working conditions thereof being altered incidentally. This is effected by mixing a potential regulated in accordance with a fixed curve with an unregulated adjustable voltage. For this object, the regulated and the unregulated voltage are impressed upon the terminals of a voltage divider from which the adjustable mixed voltage is tapped. The regulator stage, itself, is not affected thereby.

The regulator characteristic of the contrast amplifier stage and the straight line corresponding to the unregulated voltage which follows a linear law constitute the limiting lines for the adjustment of the chosen characteristic. If these limiting lines intersect in a definite reference point, then also all of the intermediate characteristics will intersect in the same point. It should also be noted that the voltages to be mixed must be in phase as far as feasible.

Figure 1:
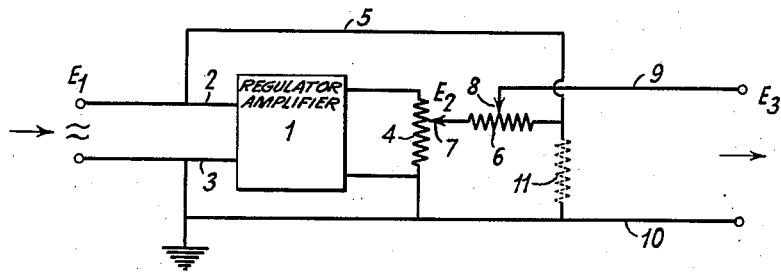
Fig. 1 illustrates an exemplified embodiment of the circuit organization here disclosed.

In the circuit arrangement shown in Fig. 1, the contrast control amplifier or regulator is fed by leads 2 and 3 with the voltage $E_1$ supplied from the input stage. The output circuit of amplifier 1 is associated with the voltage divider 4. In order to mix the unregulated voltage with the regulated voltage, the amplifier 1 is bypassed from lead 2 by way of lead 5, lead 5 being brought by way of a voltage divider 6 to the tap 7 of the voltage divider 4. The regulated output potential $E_3$ is obtained by way of tap 8 on voltage divider 6 and the leads 9 and 10. The said voltage $E_3$ is directly impressed upon the grid of the next stage, that is, a high-resistance consumer device. Voltage divider 4 has a resistance of around 10,000 ohms; voltage divider 6 is about two orders of magnitude higher. In other words, the latter has a resistance of about 1 megohm. The voltage divider 6 serves for the adjustment of the degree of contrast, while voltage divider 4 serves for adjusting the point of intersection of the regulation characteristics. If the regulator amplifier has a constant amplification factor 1, then voltage divider 4 may be dispensed with. However, inasmuch as such stability is practically never attained, it is recommended to provide the voltage divider 4 for the purpose of properly adjusting the point of intersection. Resistance 11 indicated by broken lines must be low compared with the resistance value of voltage divider 6, say, preferably less than one-hundredth of this resistance. As a general rule, this resistance which could also consist of the inner resistance of the stage controlling the regulation amplifier is less than 10,000 ohms. In such a case, about 1% of the voltage developed is impressed upon the input circuit, and this is a value not high enough to cause disturbing actions as a result of feedbacks.

Figure 2:
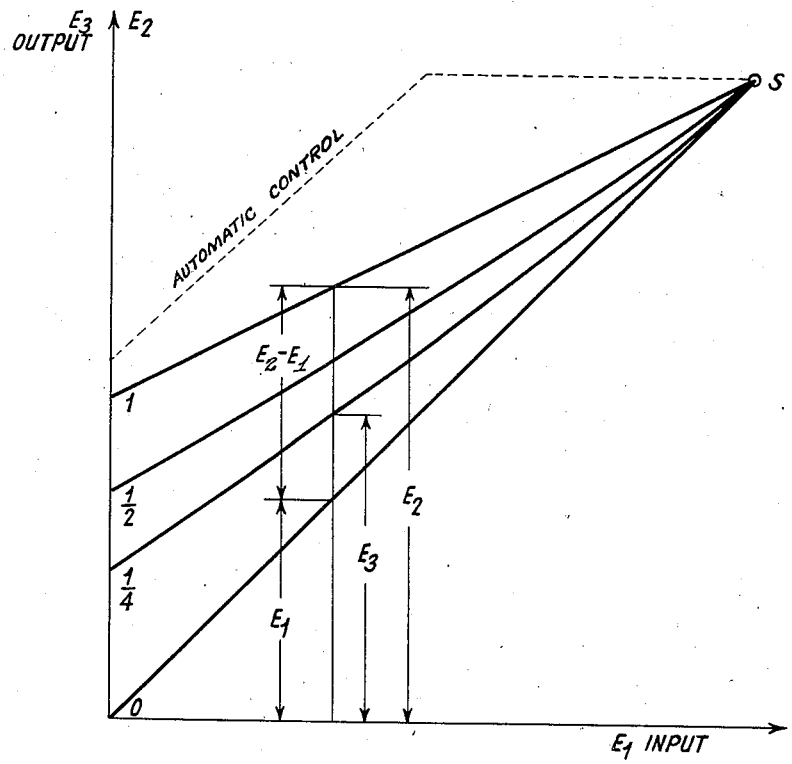
Fig. 2 shows regulator or contract control characteristics to explain the basic idea of the invention.

Fig. 2 illustrates the operation of this new circuit organization. On the abscissa are plotted the input potentials $E_1$ against the output potentials $E_3$ indicated by the ordinate. The voltage acting at tap 7 of the voltage divider 4 corresponds to the voltage $E_2$ due to the properties of the regulated amplifier. Solid line 1 at the top indicates the highest regulated voltage. This graph would indicate the output potential if contrast amplification were effected without such ways and means as are disclosed in the invention. The straight line marked "0" illustrates the dependence of the output voltage upon the input voltage in the unregulated case that is, where the volume ratio or contrast is unchanged. It has a slope of 45 degrees. Both of the said control characteristics intersect in point S. By convenient adjustment of tap 8 of voltage divider 6 it is possible to obtain straight graphs ½ or ¼ or any other straight characteristic. When the tap 8 is shifted all the way to the right-hand side the regulator amplifier is evidently disconnected, and the output voltage is equal to the input voltage. The ratio of input to output proceeds according to the straight line marked "0". But when, on the contrary, the tap 8 is shifted all the way over to the left, practically no potential will be impressed on the tap 8 by way of the bypass 5 so that the contrast characteristic will be governed only by the maximum regulated voltage of the regulator amplifier 1. In other words, the said two straight lines are the limits for the contrast control characteristics, while suitable adjustment of tap 8 will result in a regulator characteristic which lies intermediate these two limiting lines, such as the characteristic which has been designated by ¼ in Fig. 2.

The output potential $E_3$ may be calculated by the following formula:

$$E_3 = E_1 + \frac{R_3}{R} \cdot (E_2 - E_1)$$

Where $E_1$ is the input voltage, $E_2$ the voltage prevailing on tap 7 of the voltage divider 4 included in the output circuit of regulator amplifier 1, $E_3$ the output potential, R the aggregate resistance of the voltage divider 6, $R_3$ the resistance of voltage divider 6 between lead 5 and tap 8 of voltage divider 6. One limiting case is where resistance $R_3=0$, that is to say, when tap 8 has been shifted all the way to the right-hand side, which means that in the light of what has been pointed out above, the output voltage $E_3$ is equal to the input voltage $E_1$. The other limiting case is when the tap 8 has been shifted all the way to the left, when $R_3=R$ so that the output voltage $E_3$ is equal to $E_2$ the portion of the input voltage of the regulator amplifier obtained on voltage divider 4, and this also is in line with what has been pointed out above.

What precedes shows that an arrangement as here disclosed makes it feasible to insure a steady adjustment of the desired degree of contrast amplification. This is particularly valuable in control of recording work, that is, also in instances in which the monitoring operator adjusts the amplitudes manually. In the volume control heretofore customary, the monitoring operator always had to keep in mind the upper limit of potentials which could be handled under conditions free from distortion, and this task claimed his full attention. Automatic amplitude or volume control means which are occasionally provided also, as can be seen from the broken characteristic marked automatic control in Fig. 2, evidently results in distortions. As a matter of fact, the arrangement here disclosed affords the monitoring operator ways and means to vary the regulation and make adjustments entirely according to suit his own acoustic sense regardless of technical limitations. He need no longer be in fear of impairing the quality of reproduction as a consequence of distortions produced during regulation. For this purpose, the voltage divider 6 (Fig. 1) is designed so as to be manually operable by the monitoring operator. But all of the regulator characteristics which may be thus adjusted concur in the common reference point S (Fig. 2), which is the limiting point for the undistorted and full use of the transmission paths.

What is claimed is:

1. A signal system including means for automatically varying the signal volume range and having an input circuit and an output circuit and means in the output circuit for adding in phase a predetermined undistorted portion of the entire signal applied to said input circuit to the signal appearing in said output circuit.

2. A signal system including means for automatically varying the signal volume range and having an input circuit and an output circuit and means for adding in phase a predetermined undistorted portion of the entire signal applied to said input circuit to the signal appearing in said output circuit and means for varying the proportions thereof.

3. A signal system including a volume compressor having an input circuit, means for applying a signal thereto, an output circuit and means for adding an undistorted portion of the entire signal applied to said input circuit to the signal appearing in said output circuit and means for varying the proportions thereof.

4. A signal system including a volume expander having an input circuit and means for applying a signal thereto, means for adding an undistorted portion of the entire signal applied to said input circuit to the signal appearing in said output circuit and means for varying the proportions thereof.

5. A signal transmission circuit having an input circuit, means for applying a signal thereto, means for regulating the volume range of the signal, an output circuit for said regulating means and means for controlling the effect of said regulating means comprising a voltage divider in the output circuit and connections from said input circuit to said voltage divider whereby the input signal is impressed on the voltage divider in additive relation to the signal in the output circuit.

6. An automatic volume range regulator having an input circuit for applying a signal thereto and an output circuit and means for adjusting the effect of said regulator including a potential divider in the output circuit, an adjustable contact on said potential divider, a connection from one side of said potential divider to one side of said input circuit, a second potential divider having one end connected to said adjustable contact and the other end connected to the other side of said input circuit, a signal utilization circuit including said first mentioned connection and an adjustable contact on said second potential divider.

7. An automatic volume range regulator having an input circuit for applying a signal thereto and an output circuit and means for adjusting the effect of said regulator, said means including a potential divider in the output circuit, an adjustable contact on said potential divider, a connection from one side of said potential divider to one side of said input circuit, a second potential divider having one end connected to said adjustable contact and the other end connected to the other side of said input circuit, a signal utilization circuit including said first mentioned connection and an adjustable contact on said second potential divider, said second potential divider having a resistance so proportioned with respect to the impedance of said input circuit that an effective feedback to the input circuit is prevented.

8. An automatic volume range regulator having an input circuit for applying a signal thereto and an output circuit and means for adjusting the effect of said regulator, said means including a potential divider in the output circuit, an adjustable contact on said potential divider, a connection from one side of said potential divider to one side of said input circuit, a second potential divider having one end connected to said adjustable contact and the other end connected to the other side of said input circuit, a signal utilization circuit including said first mentioned connection and an adjustable contact on said second potential divider, the resistance ratio of said second potential divider to said input circuit being approximately 100 to 1.

HUBERT PFISTER.